United States Patent Office 3,644,560
Patented Feb. 22, 1972

3,644,560
OXYDEHYDROGENATION OF ETHANE
William Q. Beard, Jr., Wichita, Kans., assignor to Ethyl Corporation, New York, N.Y.
No Drawing. Filed July 14, 1969, Ser. No. 841,594
Int. Cl. C07c *11/04, 17/10;* B01j *11/40*
U.S. Cl. 260—683.3                                    9 Claims

ABSTRACT OF THE DISCLOSURE

Process for the oxydehydrogenation of ethane to ethylene by using catalytic quantities of hydrogen halide. A preferred catalyst includes a low concentration of copper or iron halide with rare earth halide, the ratio of rare earth halide to copper or iron halide being greater than 1:1. Other preferred catalyst components include alkali metal halide and manganese halide.

BACKGROUND OF THE INVENTION

The art reports the production of ethylene by oxydehydrogenation of ethane in the presence of hydrogen chloride. A major disadvantage of this process is the use of large quantities of hydrogen chloride. Whereas at one time hydrogen chloride was a troublesome by-product in the petrochemical industry and often disposed of by dumping into pits containing oyster shells, it is now in short supply and strong demand. Thus, the oxydehydrogenation process reported in the art is no longer as economical as it once was due to the rising cost of hydrogen chloride.

The primary purpose of this invention is to provide a process for the oxydehydrogenation of ethane to produce ethylene wherein the use of hydrogen halide is substantially decreased. Other purposes include the provision of (1) a continuous process having a superior catalyst, (2) a process which does not require excessively high temperatures and (3) a process wherein the byproducts formed, in addition to ethylene, are commercially valuable. Other purposes and advantages of this invention will become apparent hereinafter.

SUMMARY OF THE INVENTION

A process for the oxydehydrogenation of ethane to ethylene employing hydrogen halide wherein the improvement resides in the use of catalytic quantities of said hydrogen halide. A preferred catalyst includes a low concentration of either copper or iron halide and a quantity of rare earth halides such that the ratio of rare earth halides to copper or iron halide is greater than 1:1.

DESCRIPTION OF THE PREFERRED EMBODIMENTS

The above and other purposes are accomplished by a process for the oxydehydrogenation of ethane and the production of ethylene by contacting ethane with a fluidized catalyst, hydrogen halide, and oxygen, which may be in the form of air, at a temperature above 350° C., or preferably from about 400° C. to about 650° C., and a pressure above atmospheric or preferably from about one atmosphere to about 30 atmospheres, the fluidized catalyst being composed of a mixture containing essentially from about 0.15 percent to about 3.0 percent copper or iron halide and from about 5 percent to about 20 percent rare earth halides (hydrated) supported on a fluidized carrier, the percentages being based on the total weight of catalyst and support. The weight percent of the rare earth halides as set forth herein is based on the hydrated form, although such halides need not be hydrated during use.

The primary reason for the improved results of this invention, both economically and otherwise, is in the use not only of catalytic quantities of hydrogen halide but also the use of a fluidized, supported mixture of copper or iron halide and rare earth halide. In all instances the ratio of rare earth halide (hydrated) to copper or iron halide must exceed 1:1 and should preferably fall within the ranges hereinafter specified. Preferred conditions are (in weight percent based on the total amount of catalyst and support) a catalyst mixture supported on a fluidized solid carrier containing essentially from about 0.15 to about 3.0 percent copper or iron halide and from about 5 percent to about 20 percent rare earth halides (hydrated). Preferably, the catalyst mixture contains from about 0.25 percent to about 0.35 percent copper halide or from about 0.3 percent to about 0.4 percent iron halide and from about 8 to about 15 percent rare earth halides (hydrated). When the amount of rare earth halide and copper or iron halide in the catalyst significantly deviates from that specified above, ethylene is not usually produced and, if produced at all, is produced only in small quantities. This very significant relationship between the amount of copper or iron halide and rare earth halide will be illustrated in the examples set forth below.

By the term "rare earth halide" is meant the halides of the elements in the Lanthanum series, that is, elements having an atomic number of from 57 through 71, and mixtures of these compounds. Included among the rare earth elements are thulium, lanthanum, cerium, praseodymium, neodymium, prometheum, samarium, europium, gadolinium, terbium, dysprosium, holmium, erbium, ytterbium, lutecium, yttrium. Among the elements cerium is preferred, but praseodymium and neodymium are also excellent catalyst components for the present process. However, since these materials are usually found in nature in mixtures, it is very convenient to use a commercially available mixture. The mixtures used in formulating the catalyst contain rare earth halides, oxides, or other mixtures. Examples of minerals containing the rare earths are zircon, thorite, monazite, gadolinite, cerite, orthite, and the like. The mixture known in the art as didymium is suitable, but the mixture extracted from monazite without removal of cerium and thorium is preferred.

The temperature of this process should be above 350° C. and should preferably range from about 400° C. to about 650° C. and more preferably from about 475° C. to about 600° C. It is desirable that the pressure range from about 1 atmosphere to about 30 atmospheres and preferably from about 1 atmosphere to about 20 atmospheres. The oxygen used in this invention is usually used in the form of air; however, pure oxygen may be employed if desired.

The fluidized support may be any of the known inert carriers such as sand, diatomaceous earth, alumina, silica gel, pumice, bauxite, chromia-alumina, and the like. Preferably the catalyst support is chromia-alumina, but alumina and silica are highly satisfactory. It is highly preferable that the particle size of the impregnated catalyst be within the range of from about 120 mesh to about 325 mesh (U.S. Sieve No.). In other words, the preponderance of the catalytic material be no coarser than about 120 mesh and no finer than about 325 mesh. There is no necessity that all particles be of uniform size. The size distribution generally varies throughout the ranges indicated. Usually it is preferred that not more than about 90 percent of the catalyst be finer than 325 mesh and that not more than about 50 percent of the catalyst be coarser than 120 mesh.

If desired, an alkali metal halide may be added to the catalyst mixture in a concentration of from about 0.01 percent by weight to about 5 percent by weight, based on the total weight of catalyst and support. Preferably, it is added in concentrations of about 0.05 percent to about 3 percent, and more preferably from about 0.1 to about 2 percent. The alkali metal halides employed are preferably the chlorides of lithium, sodium, potassium, rubidium and cesium. The addition of alkali metal halide to the catalyst mixture is a preferred embodiment of the invention, and among the alkali metal halides, lithium halide is most preferred.

Other catalyst additives also enhance the performance of the catalyst of this invention. Among such additives, manganese halide in a concentration of from about 1 to about 10 percent by weight, based on the total weight of catalyst and support, is preferred. Other suitable catalyst additives include zinc halide, calcium halide, and titanium halide, among which calcium halide is preferred in a concentration of from about 1 to about 10 percent by weight, based upon the total weight of catalyst and support.

The addition of copper halide to the iron halide containing catalysts, or vice versa, has also been found beneficial, depending upon the type and quantity of other components in the catalyst. A concentration of from about 1 to about 10 weight percent of the copper or iron halide added, based on the total weight of catalyst and support, is preferred.

Another important feature of the invention is the molar feed ratio ethane/hydrogen halide/air which varies in the ranges 1/0.005 to ½ to 5. When oxygen is substituted for air as the feed, this ratio varies in the ranges 1/0.005 to 1/0.4 to 1.

The rate of flow of gases through the reaction zone is subject to some variation. Thus, sufficient flow of gases must be provided for fluidization of the supported catalyst. On the other hand, gas flow should not be so extreme as to blow significant quantities of the catalyst out of the reaction zone. It is generally preferably that the superficial linear velocity of the gases entering the reactor be maintained within a range of from about 0.1 to about 5 feet per second. More preferably, for reasons of economy, the superficial linear velocity is maintained at from about 0.5 feet per second to about 3.5 feet per second. A suitable contact time is one ranging from about 1 second up to about 20 seconds, and preferably, for best conversion, the contact time should be from about 2 to about 15 seconds.

The feed ethane, oxygen (which may be used pure, or as in air) and hydrogen halide may be fed together into the bottom of the reactor. This can be varied however, and it is indeed often desirable to do so. For instance, two of the reactants are fed into one portion of the reaction zone and the other reactant into another portion.

In the following examples, which are intended to be descriptive rather than restrictive, ethane, hydrogen halide and air (or oxygen) were fed into the bottom of a vertically elongated reaction vessel precharged with a fluidizable catalyst. The catalyst compositions are in weight percent, based on the total weight of catalyst and support. The weight percent of the rare earth halides catalyst component (including cerium halide and didymium halide) is calculated on the basis of its hydrated form, although during use, it is not necessarily fully or even partially hydrated.

EXAMPLE VII

Feed Molar Ratio:
   Ethane/HCl/Air _____ 1/0.25/3.0
Catalyst components (wt. percent):
   $CuCl_2$ _____ 0.10
   Rare earth Cl (hydrated) _____ 10.0
   LiCl _____ 0.04
Catalyst support _____ alumina
Temperature (0 C.) _____ 550
Pressure (atm.) _____ 1
Ethane conversion (percent) _____ 54.1
Ethylene yield (percent) _____ 70.0

EXAMPLE VIII

The preceding examples are repeated so that each example includes runs which differ with regard to use of the following copper chloride or iron chloride (substituted for copper chloride) concentrations (in weight percent, based on the total weight of catalyst and support): 0.01, 0.05, 0.1, 0.15, 0.2, 0.25, 0.3, 0.35, 0.4, 0.45, 0.5, 1.0, 5.0, 10.0. Optimum results are indicated to be between 0.25 and 0.35 weight percent for copper chloride and 0.3 to 0.4 weight percent for iron chloride.

EXAMPLE IX

The preceding examples are repeated so that each example includs runs which differ in the use of the following iron chloride concentrations where copper chloride is already employed or copper chloride where iron chloride is already employed (in weight percent based on the total weight of catalyst and support): 1, 2, 3, 5, 10.

EXAMPLE X

The preceding examples are repeated so that each example includes runs which differ with regard to use of cerium chloride, didymium chloride, or rare earth chlorides extracted from monazite without removal of cerium or thorium, each in the following concentrations (in weight percent, based on the total weight of support and catalyst): 0.01, 0.1, 1, 5, 10, 15, 20, 25. Cerium chloride performs best, and optimum results therefor are indicated to be between 5 and 15 weight percent.

EXAMPLE XI

The preceding examples are repeated so that each example includes runs which differ with regard to use of lithium chloride, sodium chloride, potassium chloride, rubidium chloride or cesium chloride, each in the following concentrations (in weight percent, based on the total weight of catalyst and support): 0.01, 0.05, 0.1, 0.5, 1, 2, 5, 10. Lithium chloride performs best, and optimum results therefor are indicated to be between 0.5 and 2 weight percent.

EXAMPLE XII

The preceding examples are repeated so that each example includes runs which differ with regard to use of manganese chloride, calcium chloride, zinc chloride or titanium chloride, each in the following concentrations (in weight percent, based on the total weight of catalyst and support): 0.01, 1, 5, 10, 20. Manganese chloride per-

| Example | I | II | III | IV | V | VI |
|---|---|---|---|---|---|---|
| Feed molar ratio, ethane/HCl/air | 1/0.25/3.0 | 1/0.125/2.5 | 1/0.125/2.5 | 1/0.125/2.5 | 1/0.25/3.7 | 1/0.25/2.5 |
| Catalyst components (wt. percent): | | | | | | |
| $CuCl_2$ | 0.5 | 0.5 | 1.0 | 0.35 | 0.35 | 0.25 |
| Rare earth Cl (hydrated) | 10.0 | 10.0 | 10.0 | 10.0 | 10.0 | 10.0 |
| LiCl | 0.0 | 0.0 | 0.2 | 0.07 | 0.07 | 0.05 |
| Catalyst support | Alumina | Alumina | Alumina | Alumina | Alumina | Alumina |
| Temperature (° C.) | 550 | 550 | 550 | 550 | 550 | 550 |
| Pressure (atm.) | 1 | 1 | 1 | 1 | 1 | 1 |
| Ethane conversion (percent) | 68.6 | 53.6 | 54.7 | 51.1 | 77.7 | 55.3 |
| Ethylene yield (percent) | 80.2 | 80.4 | 78.7 | 80.5 | 74.6 | 82.5 | forms best, with calcium chloride being better than either zinc chloride or titanium chloride; optimum results for both manganese chloride and calcium chloride are indicated to be between 1 and 10 weight percent.

EXAMPLE XIII

The preceding examples are repeated so that each example includes runs at the following temperatures: 300° C., 350° C., 650° C. and 700° C. Optimum results are indicated to be between 350° C. and 650° C.

EXAMPLE XIV

The preceding examples are repeated so that each example includes runs which differ with regard to use of the following catalyst supports: sand, diatomaceous earth, alumina, silica gel, pumice, bauxite, or chromia-alumina. Chromia-alumina performs best, with alumina and silica gel being better than the other supports.

EXAMPLE XV

The preceding examples are repeated so that each example includes runs which differ with regard to the following pressures (in atmospheres): 2, 5, 10, 13, 15, 20, 30.

EXAMPLE XVI

The preceding examples are repeated so that each example includes runs which differ with regard to the use of pure oxygen or air as a component of the feed stream.

EXAMPLE XVII

The preceding examples are repeated so that each example includes runs which differ with respect to the hydrogen chloride component of the feed molar ratio which is, respectively: 0.005, 0.01, 0.05, 0.1, 0.2, 0.5, 1.0.

EXAMPLE XVIII

The preceding examples are repeated, first, omitting the rare earth chlorides and, second, employing the following concentrations of iron chloride or copper chloride and rare earth chlorides (in weight percent, based on the total weight of catalyst and support): (1) 4 percent iron chloride or copper chloride and 3 percent rare earth chlorides (2) 1 percent iron chloride or copper chloride and 0.5 percent rare earth chlorides, (3) 15 percent iron chloride or copper chloride and 0.15 percent rare earth chlorides. In each instance low yields of ethylene are experienced.

EXAMPLE XIX

The preceding examples are repeated, first, changing the hydrogen chloride to hydrogen bromide and the metal chlorides to metal bromide and, second, changing the hydrogen chloride to hydrogen iodide and the metal chlorides to metal iodides. Good results are experienced except with Example XVIII.

While the catalytic mixtures of this invention can be deposited upon the fluidized solid support in a number of different ways, a very simple and highly preferred method of impregnating the support is to dissolve in water or an alcohol a weighed amount of the components of the catalyst mixture. A weighed amount of the support is then added to the water or alcohol and the contents stirred until completely homogenous. The water or alcohol is then evaporated at low temperature from the so-formed slurry. The evaporation is conveniently done by drying at a low temperature, e.g. about 100° C. in a low temperature air circulating oven. The dry impregnated support remaining can then be employed in the process of this invention.

I claim:
1. In a process for the oxydehydrogenation of ethane to ethylene in the presence of oxygen and a hydrogen halide, the improvement which comprises; using a molar ratio of ethane to hydrogen halide of from about 1/0.005 to about 1/1, and catalyzing the reaction with a supported catalyst comprising (a) from about 0.15 to about 3.0 weight percent of a metal halide selected from the group consisting of copper halide and iron halide, and (b) from about 5 to about 20 weight percent rare earth halide, wherein the ratio of the concentration of the rare earth halide to the metal halide is greater than 1:1, all concentrations being based on the total weight of catalyst and support.
2. The process of claim 1 wherein said hydrogen halide is hydrogen chloride.
3. The process of claim 2 wherein said rare earth halides are cerium halide.
4. The process of claim 3 wherein said catalyst includes from about 0.01 to about 5 weight percent of an alkali metal halide.
5. The process of claim 4 wherein said alkali metal halide is lithium halide.
6. The process of claim 5 wherein said catalyst includes from about 0.01 to about 20 weight percent of a compound selected from the group consisting of manganese halide, calcium halide, zinc halide, and titanium halide.
7. The process of claim 6 wherein said catalyst is copper chloride and wherein from about 1 to about 10 weight percent of iron chloride is additionally present.
8. The process of claim 6 wherein the catalyst is iron chloride and wherein from about 1 to about 10 weight percent copper chloride is additionally present.
9. The process of claim 2 wherein said catalyst is supported by a support selected from the group consisting of silica gel, alumina, and chromia-alumina.

References Cited
UNITED STATES PATENTS

| | | | |
|---|---|---|---|
| 2,327,174 | 8/1943 | Cass | 260—654 |
| 2,838,577 | 6/1958 | Cook et al. | 260—656 |
| 3,267,161 | 8/1966 | Ukaji et al. | 260—659 |
| 3,278,627 | 10/1966 | Hartnett | 260—683.3 |

DELBERT E. GANTZ, Primary Examiner

G. E. SCHMITKONS, Assistant Examiner

U.S. Cl. X.R.

152—441, 442; 260—656 R, 659 A, 662 A, 663, 677 XA